(12) United States Patent
Chang et al.

(10) Patent No.: US 10,895,930 B2
(45) Date of Patent: Jan. 19, 2021

(54) MESSAGE ERASING DEVICE AND MESSAGE ERASING SYSTEM

(71) Applicant: Waltop International Corporation, Hsinchu (TW)

(72) Inventors: Yi-Chih Chang, Hsinchu (TW); Ying-Hwa Tang, Hsinchu (TW)

(73) Assignee: WALTOP INTERNATIONAL CORPORATION, Hsinchu (TW)

( * ) Notice: Subject to any disclaimer, the term of this patent is extended or adjusted under 35 U.S.C. 154(b) by 0 days.

(21) Appl. No.: 16/534,341

(22) Filed: Aug. 7, 2019

(65) Prior Publication Data
US 2020/0050340 A1   Feb. 13, 2020

(30) Foreign Application Priority Data
Aug. 10, 2018   (TW) .............................. 107128013 A (51) Int. Cl.
*G06F 3/041*   (2006.01)
(52) U.S. Cl.
CPC ............................... *G06F 3/04162* (2019.05)
(58) Field of Classification Search
None
See application file for complete search history.

(56) References Cited

U.S. PATENT DOCUMENTS

| 2010/0084203 A1 | 4/2010 | Peng |
| 2014/0002422 A1* | 1/2014 | Stern ..................... G06F 3/0383 |
| | | 345/179 |

FOREIGN PATENT DOCUMENTS

| TW | M517860 U | 2/2016 |
| TW | 201702814 A | 1/2017 |
| TW | I623860 B | 5/2018 |

* cited by examiner

*Primary Examiner* — Brian M Butcher
(74) *Attorney, Agent, or Firm* — Li & Cai Intellectual Property (USA) Office (57) ABSTRACT

A message erasing device and a message erasing system, and the message erasing system includes a message erasing device and a message receiving device. The message erasing device includes a device body, a processing module, and an erasing module. The device body touches the message receiving device by a clearing unit and erases an actual message of the message receiving device, and the movable unit touches the processing module according to the clearing unit touching the message receiving device, so that the processing module generates an erasing signal to the message receiving device. The message receiving device provides a clear signal to an electronic device according to the erasing signal.

8 Claims, 13 Drawing Sheets

MESSAGE ERASING DEVICE AND MESSAGE ERASING SYSTEM

CROSS-REFERENCE TO RELATED PATENT APPLICATION

This application claims the benefit of priority to Taiwan Patent Application No. 107128013, filed on Aug. 10, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a message erasing, and more particularly to a message erasing device and message erasing system.

BACKGROUND OF THE DISCLOSURE

There are many ways to operate a touchpad, and the most common one is to touch or slide a finger or a stylus on a surface of the touchpad so that the sensor in the touchpad produces corresponding signals. However, at present, the stylus is the only existing peripheral product for the touchpad, and only has the function of touching, with has no other novel or additional functions.

SUMMARY OF THE DISCLOSURE

In response to the above-referenced technical inadequacies, the present disclosure provides a message erasing device and a message erasing system.

In one aspect, the present disclosure provides a message erasing device and a message erasing system, and the message erasing device includes a device body, a processing module, and an erasing module. The device body has an opening. The processing module is located in the device body. The erasing module includes a movable unit having an accommodating space and movably disposed in the opening and a clearing unit located in the accommodating space. The message receiving device communicatively links to the processing module. The device body touches the message receiving device by the clearing unit and erases the actual message of the message receiving device, and the movable unit touches the processing module according to the clearing unit touching the message receiving device, so that the processing module generates the erasing signal to the message receiving device. Moreover, the message receiving device provides a clear signal to the electronic device according to the erasing signal.

In one aspect, the present disclosure provides a message erasing device, which includes a device body, a processing module, and an erasing module. The device body has opening. The processing module is located in the device body. The erasing module includes a movable unit having an accommodating space and movably disposed in the opening and a clearing unit located in the accommodating space. The device body touches the message receiving device by the clearing unit and erases the actual message of the message receiving device, and the movable unit touches the processing module according to the clearing unit touching the message receiving device, so that the processing module generates the erasing signal to the message receiving device.

Therefore, one of the beneficial effects of the present disclosure is that the message erasing device and the message erasing system provided by the present disclosure provide users with the ability to erase actual messages, such as words, numbers, or patterns in the message receiving device, as well as erase the corresponding virtual texts such as words, numbers or patterns.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

FIG. 3 is a schematic structural view of a message erasing system and a message erasing device according to a second embodiment of the present disclosure, and FIG. 3 is also an enlarged view of a portion III in FIG. 2.

FIG. 5 is a schematic structural view of the message erasing system and the message erasing device according to the second embodiment of the present disclosure, and FIG. 5 is also an enlarged view of a portion III in FIG. 2.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 1:
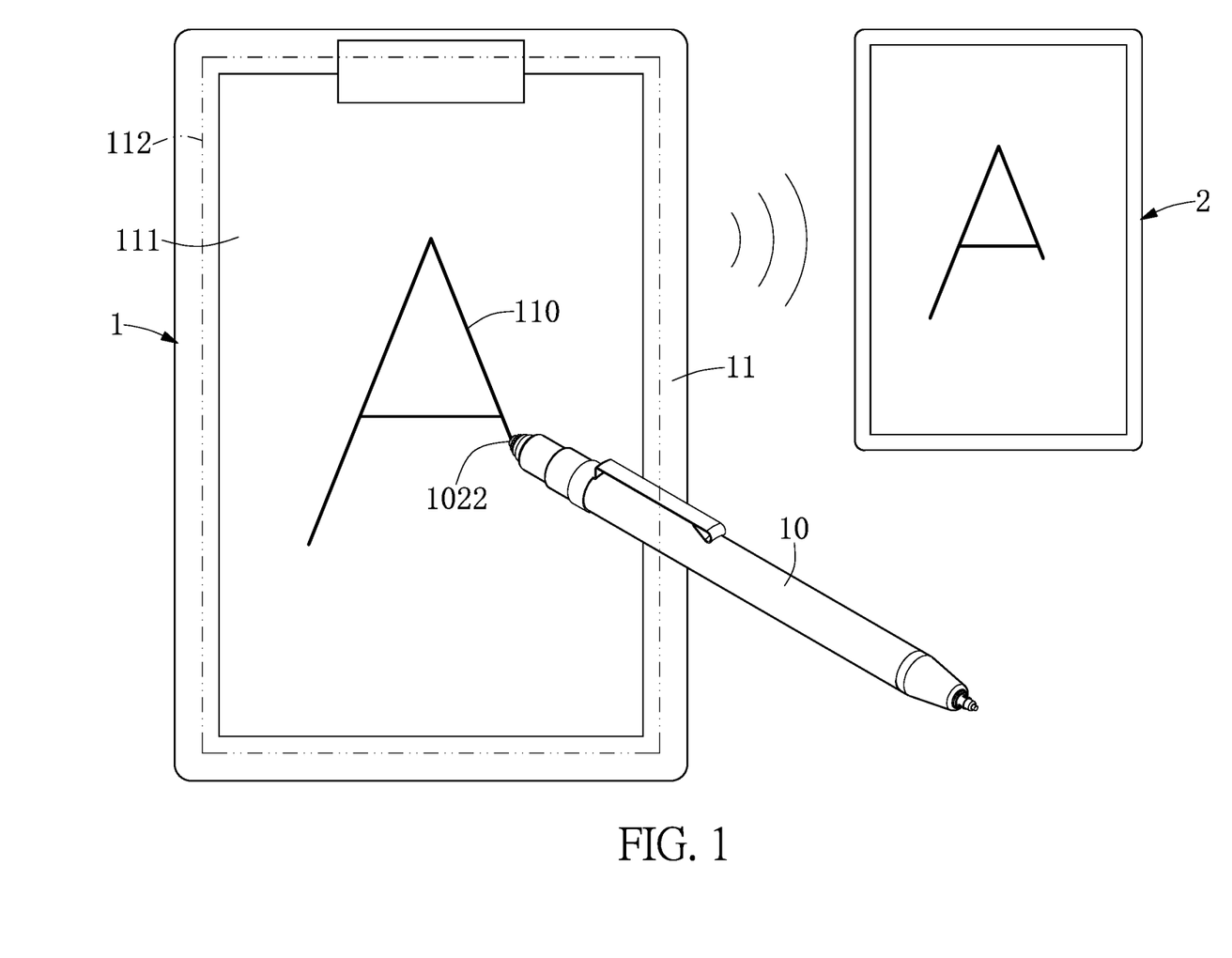
FIG. 1 is a schematic view of a message erasing system in use according to a first embodiment of the present disclosure.
Figure 2:
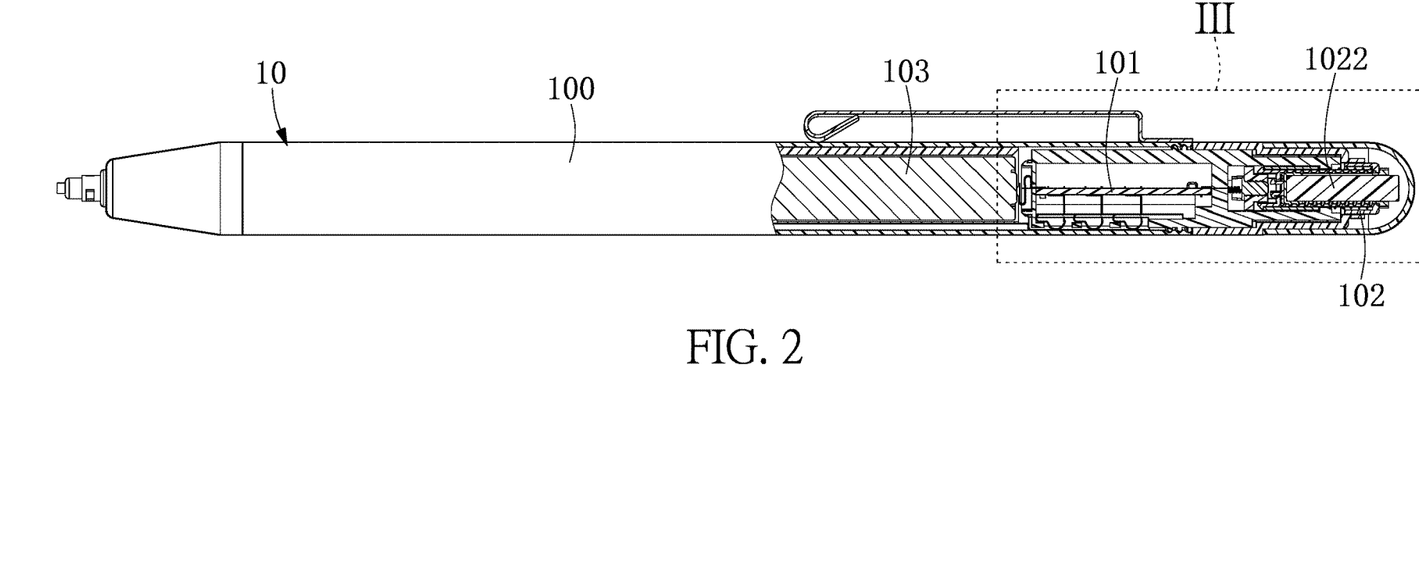
FIG. 2 is a schematic structural view of the message erasing system according to the first embodiment of the present disclosure.

Referring to FIG. 1 and FIG. 2, a first embodiment of the present disclosure provides a message erasing system 1 including a message erasing device 10 and a message receiving device 11. The message erasing device 10 includes a device body 100, a processing module 101, and an erasing module 102. The device body 100 has opening 1000. The processing module 101 is located in the device body 100. The erasing module 102 includes a movable unit 1021 having an accommodating space 1020 and movably passing through the opening 1000 and a clearing unit 1022 located at the accommodating space 1020. The message receiving device 11 communicatively links to the processing module 101. The device body 100 touches the message receiving device 11 and clears the actual message 110 of the message receiving device 11 through the clearing unit 1022, and the movable unit 1021 touches the processing module 101 according to the clearing unit 1022, so that the processing module 101 generates an erasing signal to the message receiving device 11. The message receiving device 11 provides a clear signal to an electronic device 2 according to the erasing signal.

Specifically, the message erasing system 1 provided by the present disclosure includes the message erasing device 10 and the message receiving device 11. The message erasing device 10 includes the device body 100, the processing module 101, and the erasing module 102. The device body 100 can be a stylus structure, but the present disclosure is not limited thereto. The processing module 101 can be a processing module in a general stylus. The erasing module 102 further includes the movable unit 1021 and the clearing unit 1022, the movable unit 1021 can be movably disposed through the opening 1000 of the device body 100, and the movable unit 1021 has an accommodating space 1020 for accommodating the clearing unit 1022. The clearing unit 1022 can be a consumable cleaning item, such as an eraser, but the present disclosure is not limited thereto. The message receiving device 11 may include a carrier 111 for the user to draw any message (such as paper, but not limited thereto) and a touchpad 112 (which may be a tablet, but not limited thereto), and the touchpad 112 may be in communication with the processing module 101.

Therefore, the user can perform teaching or recording through the message erasing system 1 of the present disclosure and the electronic device 2 (for example, a television, a computer, a projection device, or a mobile phone, but the present disclosure is not limited thereto). When the user wants to erase the actual message 110 of the carrier 111 and a corresponding virtual message in the electronic device 2, the device body 100 can be operated to touch the carrier 111 of the message receiving device 11 by using the clearing unit 1022, and indirectly touch the touchpad 112. Then, the actual message 110 on the message receiving device 11 is erased by the clearing unit 1022. In a process of erasing the actual message 110 in the clearing unit 1022, the movable unit 1021 is linked, and the moving unit 1021 is touched by the processing module 101. At this time, the processing module 101 generates an erasing signal corresponding to the clearing unit 1022 erasing behavior according to the touch of the movable unit 1021. Then, the processing module 101 transmits the erasing signal to the touchpad 112 of the message receiving device 11, and the touchpad 112 of the message receiving device 11 generates the clear signal to the electronic device 2 according to the erasing signal, so that the virtual message displayed by the electronic device 2 corresponds to the actual message 110 is erased, and a synchronous presentation is erased (as shown in FIG. 1).

Therefore, the message erasing system 1 provided by the present disclosure can provide the user with the actual messages 110 such as words, number or pattern on the message receiving device 11, and can also erase the corresponding virtual texts such as words, numbers or patterns on electronic device 2.

In addition, the message erasing device 10 of the present disclosure may further include a battery module 103, which may be a rechargeable battery. The battery module 103 is located in the device body 100 and electrically connected to the processing module 101 to provide power required for operating the processing module 101.

Second Embodiment

Figure 3:
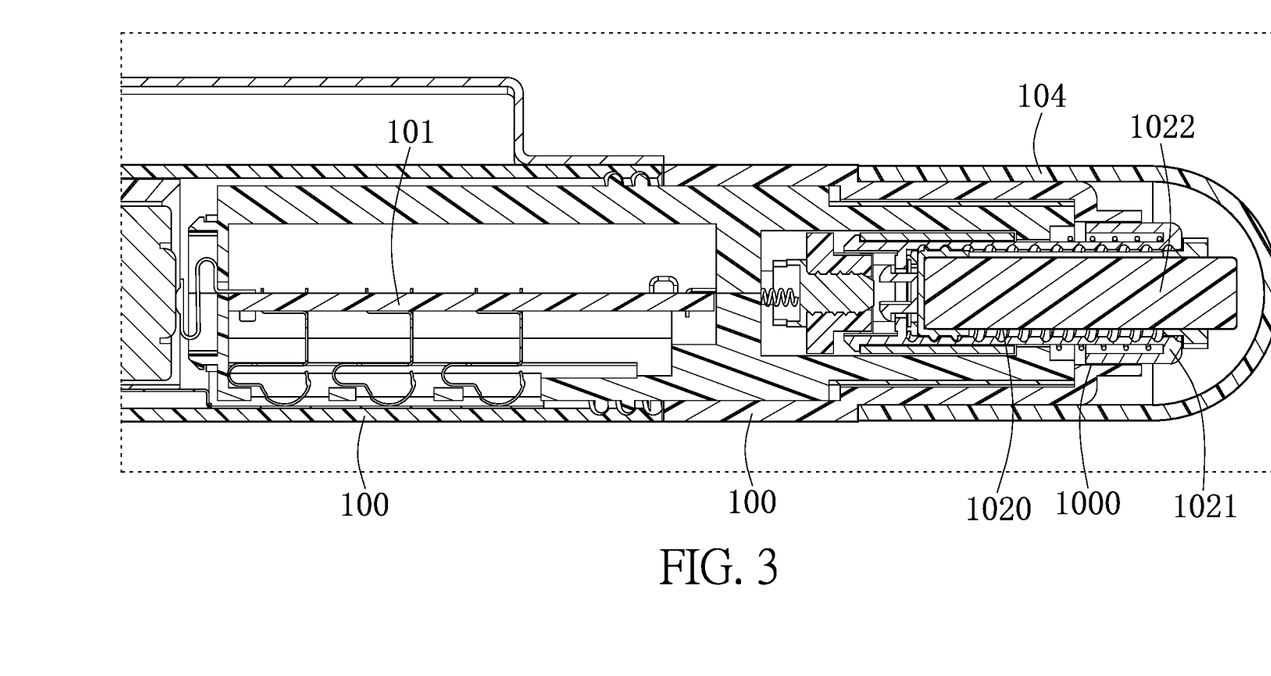
Figure 4:
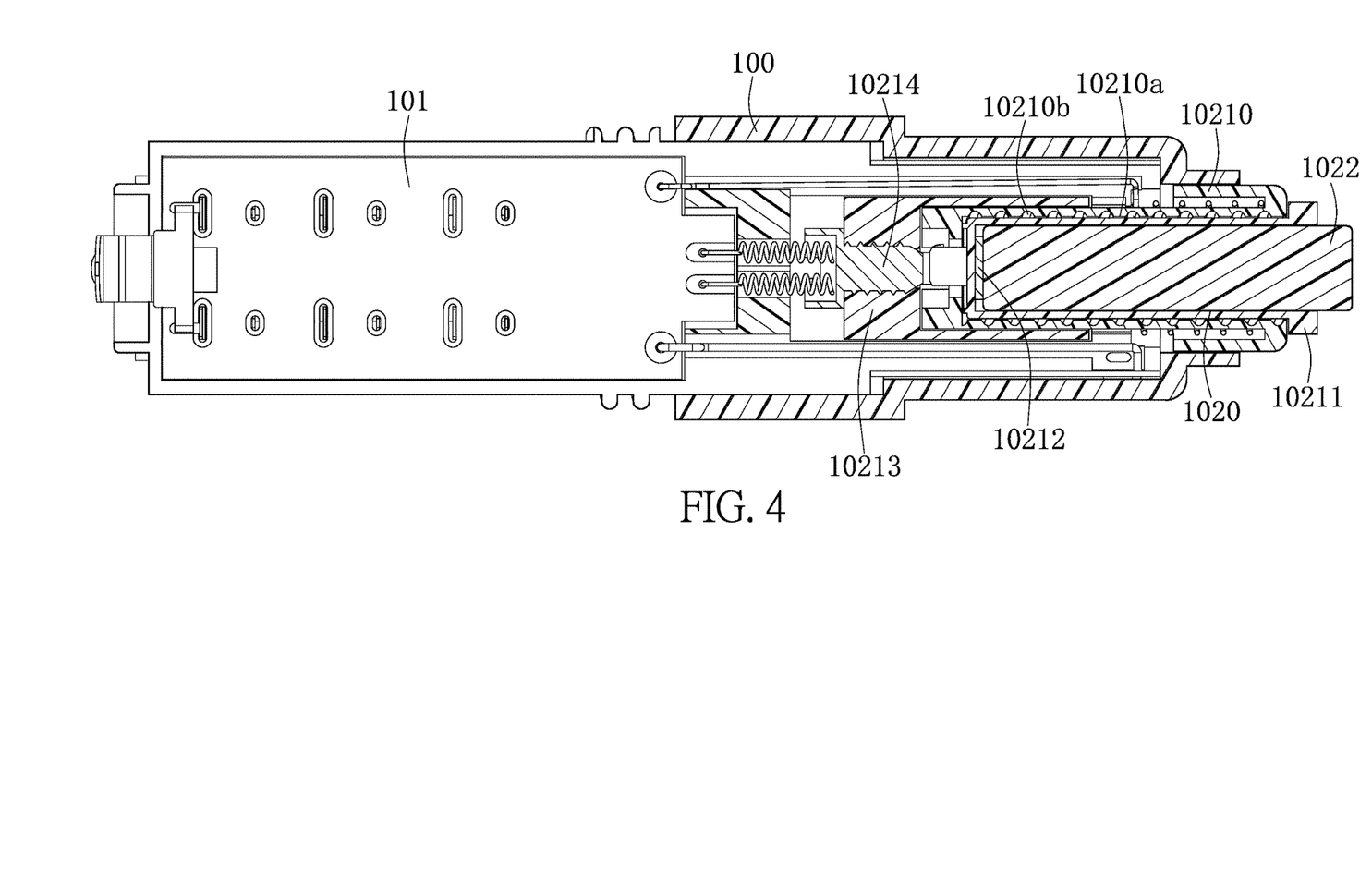
FIG. 4 is a schematic structural view of the message erasing system and the message erasing device according to the second embodiment of the present disclosure.
Figure 5:
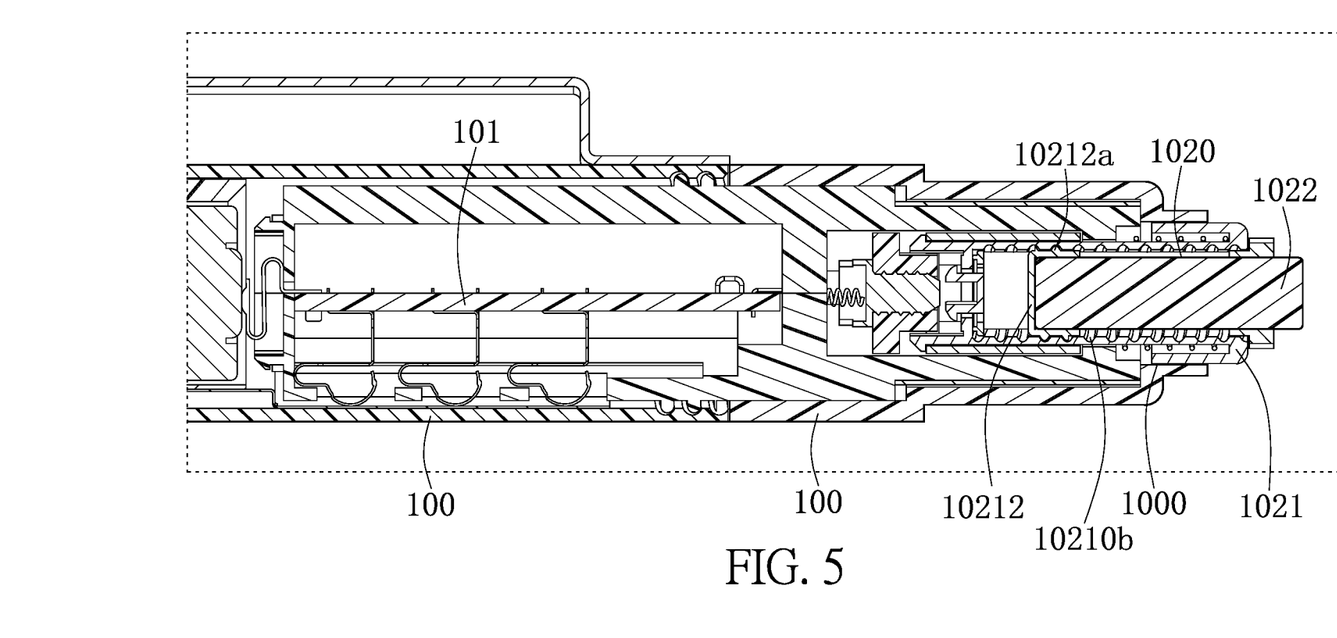

Referring to FIG. 3 to FIG. 5, together with FIG. 1 and FIG. 2, schematic structural views of a message erasing system and a message erasing device according to the second embodiment of the present disclosure is shown. As shown in the figures, the message erasing system according to the second embodiment of the present disclosure is slightly similar to that of the first embodiment. Therefore, similar steps will not be repeated herein. It should be noted that, in this embodiment, the movable unit 1021 includes a fixing member 10210, a positioning member 10211, a sliding member 10212, a limiting member 10213, and a limiting member 10214. The fixing member 10210 can be movably disposed in the opening 1000, the fixing member 10210 has a lodging space 10210a, and the fixing member 10210 has a guiding portion 10210b corresponding to the inner wall surface of the lodging space 10210a. The positioning member 10211 can be movably disposed in the lodging space 10210a, and the positioning member 10211 has the accommodating space 1020 and a plurality of movable slots 10211a communicating with the accommodating space 1020. The sliding member 10212 is movably located in an accommodating space 1020. A side of the sliding member 10212 has a linking portion 10212a movably disposed through each movable slot 10211a, and the plurality of linking portions 10212a are movably coupled to the guiding portion 10210b. The limiting member 10213 can be movably located in the device body 100 and detachably connected to the fixing member 10210. The limiting member 10214 is detachably coupled to the limiting member 10213. A clearing unit 1022 is detachably connected to the sliding member 10212 and partially exposed from the outside of the positioning member 10211. The positioning member 10211 drives the corresponding linking portion 10212a by each movable slot 10211a, and the plurality of linking portions 10212a are guided by the guiding portion 10210b, so that the sliding member 10212 drives the clearing unit 1022 to move in a predetermined direction. The sliding member 10212 touches the message receiving device 11 according to the clearing unit 1022, and links the positioning member 10211, the fixing member 10210, and the limiting member 10213 so that the limiting member 10213 touches the processing module 101 through the limiting member 10214.

For example, the fixing member 10210 of the present disclosure has a lodging space 10210a for placing the positioning member 10211, and the guiding portion 10210b may be in a shape of a spiral. One end of the positioning member 10211 is pivotally connected to the fixing member 10210. The positioning member 10211 has a plurality of movable slots 10211a extending through the body. The movable slot 10211a may be in a shape of a strip, but the present disclosure is not limited thereto. The clearing unit 1022 is placed in the accommodating space 1020 and partially exposed outside the positioning member 10211, and the exposed portion can be 2 mm, but the present disclosure is not limited thereto.

Therefore, when a user erases the message by using the message erasing device 10, the actual message 110 on the carrier 111 can be erased by the clearing unit 1022, and the touchpad 112 is touched through the carrier 111. Moreover, in a process of erasing the actual message 110, a reaction force generated by the clearing unit 1022 pressing the carrier 111 is linked to the fixing member 10210 through the sliding member 10212, and the fixing member 10210 drives the limiting member 10213 and the limiting member 10214 to be displaced, so that the limiting member 10214 touches the processing module 101. Then, the processing module 101 generates an erasing signal according to the triggering of the limiting member 10214, and transmits the erasing signal to the touchpad 112 of the message receiving device 11, so that the virtual message displayed by the electronic device 2 is synchronously erased.

Moreover, when the clearing unit 1022 is consumed to be unusable or difficult to use, the user can rotate the positioning member 10211 in the first direction, and the plurality of linking portions 10212a are displaced by the plurality of movable slots 10211a. Since the plurality of linking portions 10212a are displaced along the guiding portion 10210b, the sliding member 10212 can move the clearing unit 1022 away from the processing module 101, so that part of the clearing unit 1022 is exposed outside the positioning member 10211 (as shown in FIG. 5). Conversely, after the user installs a new clearing unit 1022 in the sliding member 10212, the user can rotate the positioning member 10211 in the second direction, and the clearing unit 1022 drives the clearing unit 1022 toward the processing module 101 through the sliding member 10212. The first direction and the second direction may be a clockwise or counterclockwise direction of rotation, and the first direction and the second direction are opposite to each other, but the present disclosure is not limited thereto.

In addition, the message erasing device 10 of the present disclosure may further include a cap module 104 detachably coupled to the device body 100. Therefore, when the user does not use the erasing module 102, the erasing module 102 can be joined to the device body 100 by the cap module 104.

Third Embodiment

Figure 6:
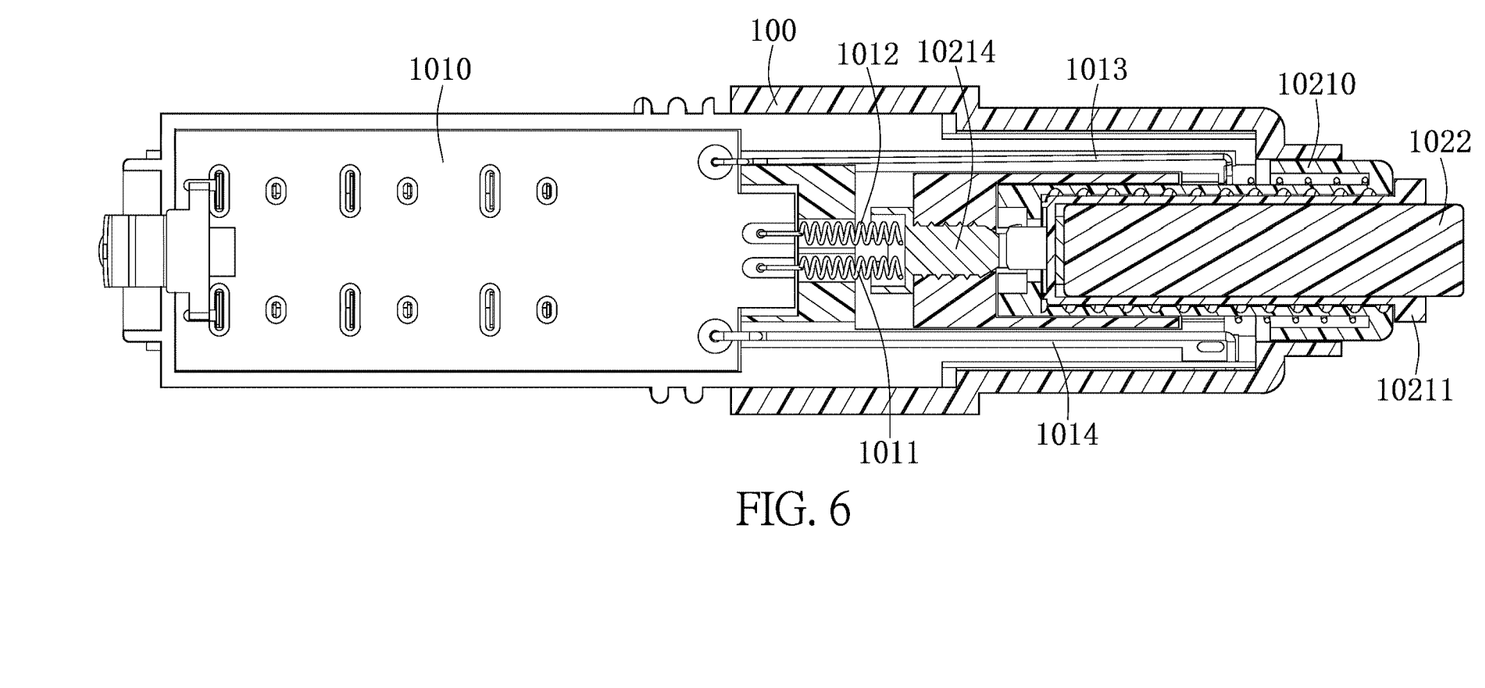
FIG. 6 is a schematic structural view of a message erasing system and a message erasing device according to a third embodiment of the present disclosure.
Figure 7:
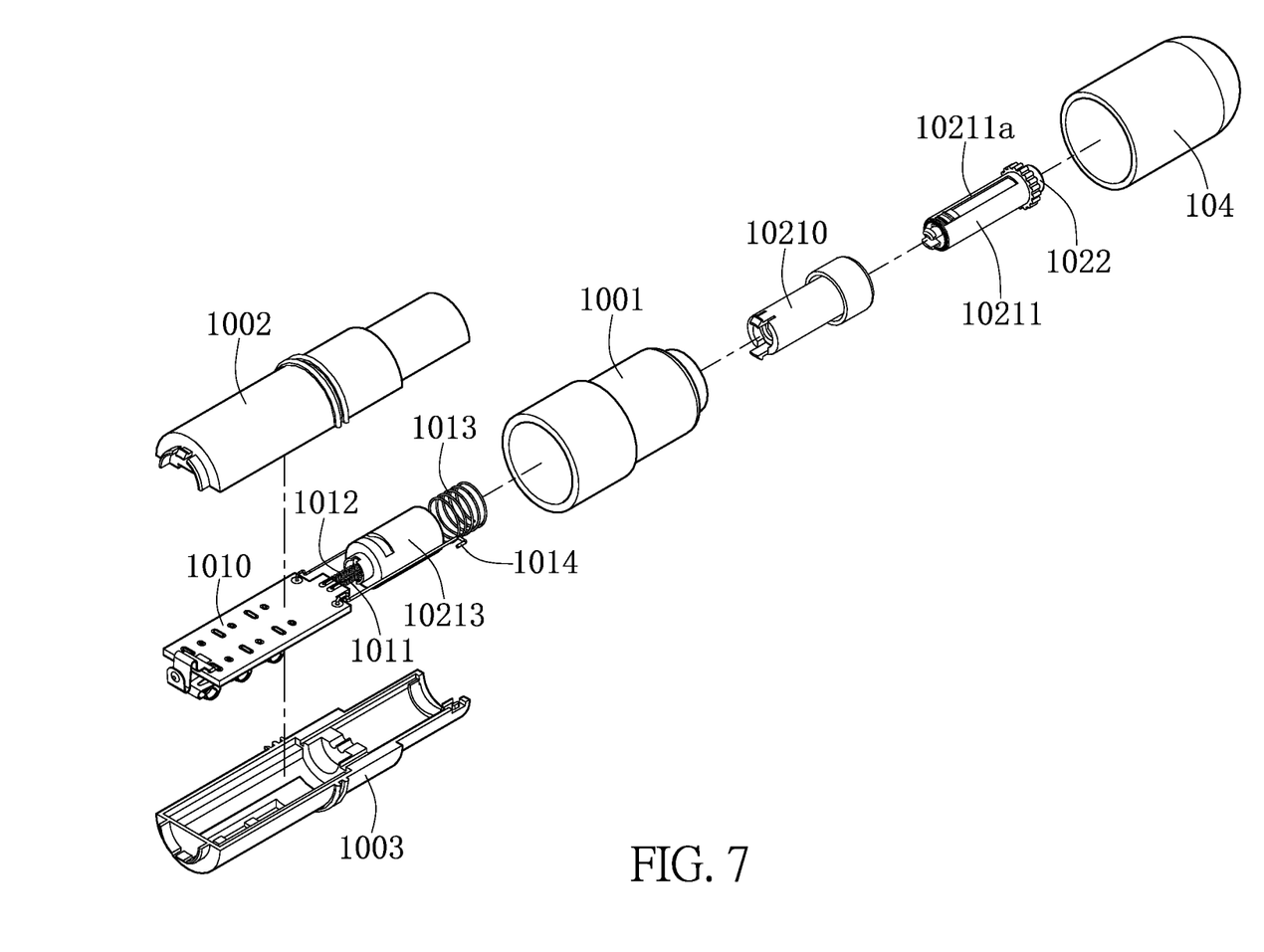
FIG. 7 is a schematic structural view of the message erasing system and the message erasing device according to the third embodiment of the present disclosure.
Figure 8:
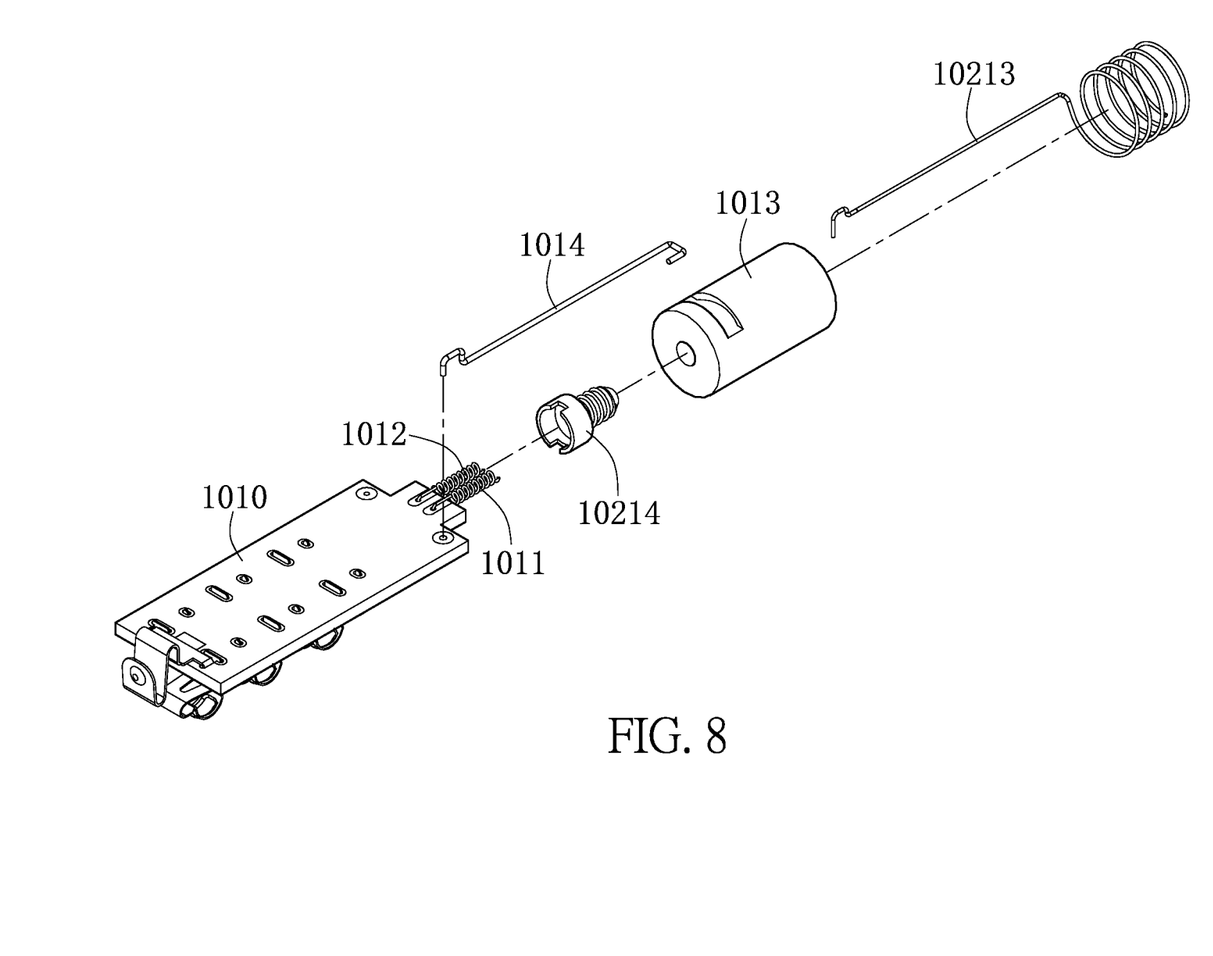
FIG. 8 is a schematic structural view of the message erasing system and the message erasing device according to the third embodiment of the present disclosure.

Referring to FIG. 6 to FIG. 8 together with FIG. 1 to FIG. 5, schematic structural views of a message erasing system and a message erasing device according to the third embodiment of the present disclosure is shown. As shown in the figures, the message erasing system according to the third embodiment of the present disclosure is slightly similar to that of the above-mentioned embodiments. Therefore, similar steps will not be repeated herein. It should be noted that in the present embodiment, a processing module 101 includes a processing substrate 1010, a first actuator 1011, a second actuator 1012, and a sensing member 1013. The processing substrate 1010 is located in the device body 100. One end of the first actuator 1011 is electrically connected to the processing substrate 1010. One end of the second actuator 1012 is electrically connected to the processing substrate 1010. One end of the sensing member 1013 is electrically connected to the processing substrate 1010, and the other end of the sensing member 1013 surrounds the positioning member 10211. A limiting member 10213 touches the other end of the first actuator 1011 and the other end of the second actuator 1012 through the limiting member 10214, so that the first actuator 1011 and the second actuator 1012 are electrically connected through the limiting member 10214. The processing substrate 1010 is electrically connected according to the first actuator 1011 and the second actuator 1012 to generate an erasing signal.

Specifically, the processing substrate 1010 of the present disclosure can have a circuit board having functions of signal transmission, signal reception, and operation. The first actuator 1011 and the second actuator 1012 may be metal spiral conductor members. One end of the first actuator 1011 and one end of the second actuator 1012 is electrically connected to the processing substrate 1010, and the other ends of the first actuator 1011 and the second actuator 1012 are adjacent to the limiting member 10214. The sensing member 1013 can be a wiping signal sensing spring. Therefore, in a process of erasing the actual message 110 in the message erasing device 10, a reaction force generated by a clearing unit 1022 touching a carrier 111 is linked to a fixing member 10210 through a sliding member 10212, so that the fixing member 10210 drives the limiting member 10213 and the limiting member 10214 to be displaced, the limiting member 10214 is activated by the first actuator 1011 and the second actuator 1012, and the first actuator 1011 and the second actuator 1012 are electrically connected by the limiting member 10214. Next, the processing substrate 1010 generates an erasing signal based on the conduction of the first actuator 1011 and the second actuator 1012.

In addition, the device body 100 of the present disclosure may further include a receiving member 1001, a first supporting member 1002, and a second supporting member 1003. The first supporting member 1002 and the second supporting member 1003 may cover the processing module 101 and the part of the movable unit 1021, and the receiving member 1001 may cover part of the first supporting member 1002, part of the second supporting member 1003, and the movable unit 1021. The processing module 101 can further include a grounding member 1014, which can be a wiping signal grounding wire. One end of the grounding member 1014 is electrically connected to the processing module 101, and the other end is connected to the first supporting member 1002 or the second supporting member 1003. The processing substrate 1010 is located in the device body 100.

Fourth Embodiment

Figure 9:
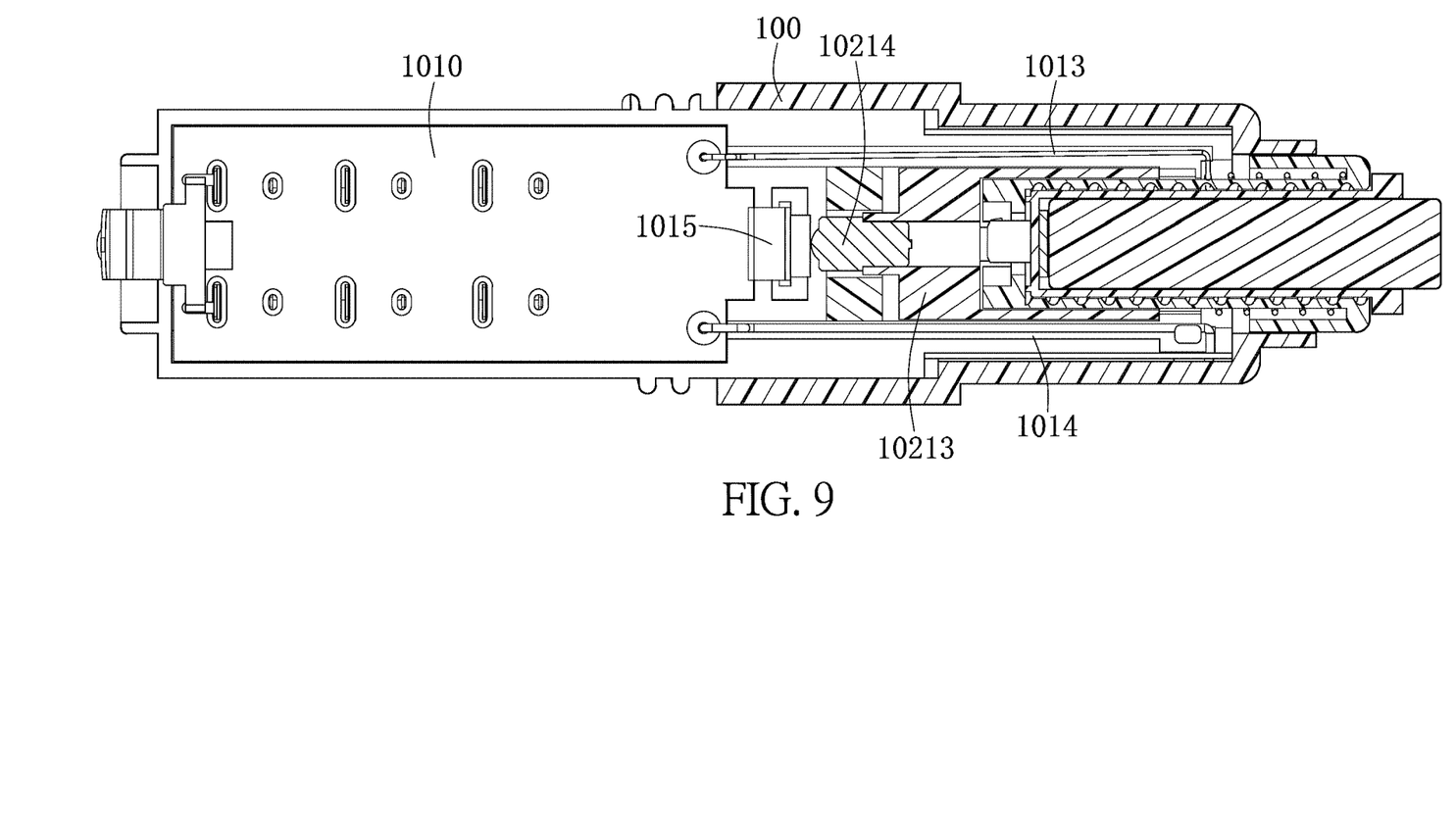
FIG. 9 is a schematic structural view of a message erasing system and a message erasing device according to a fourth embodiment of the present disclosure.
Figure 10:
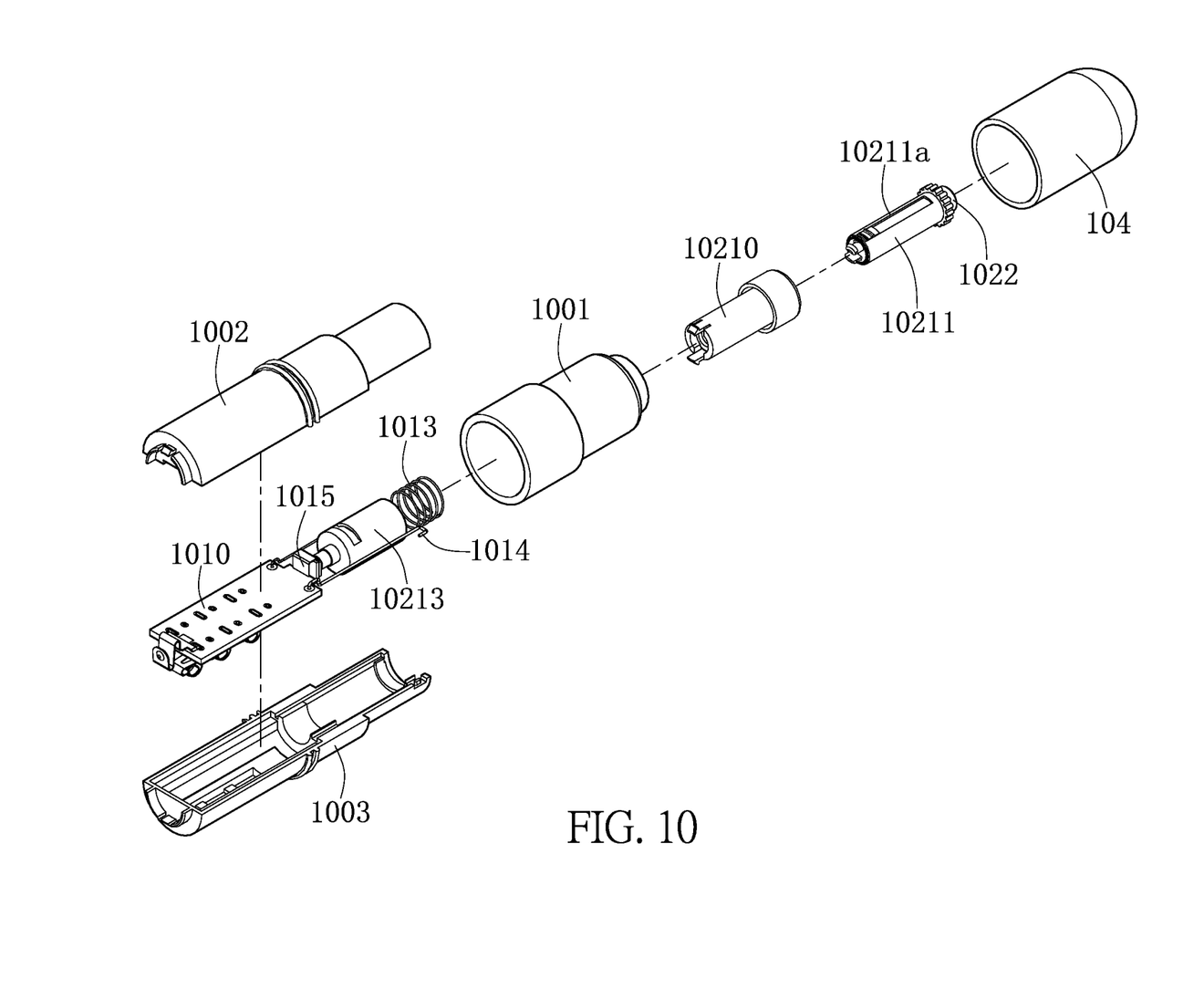
FIG. 10 is a schematic structural view of the message erasing system and the message erasing device according to the fourth embodiment of the present disclosure.
Figure 11:
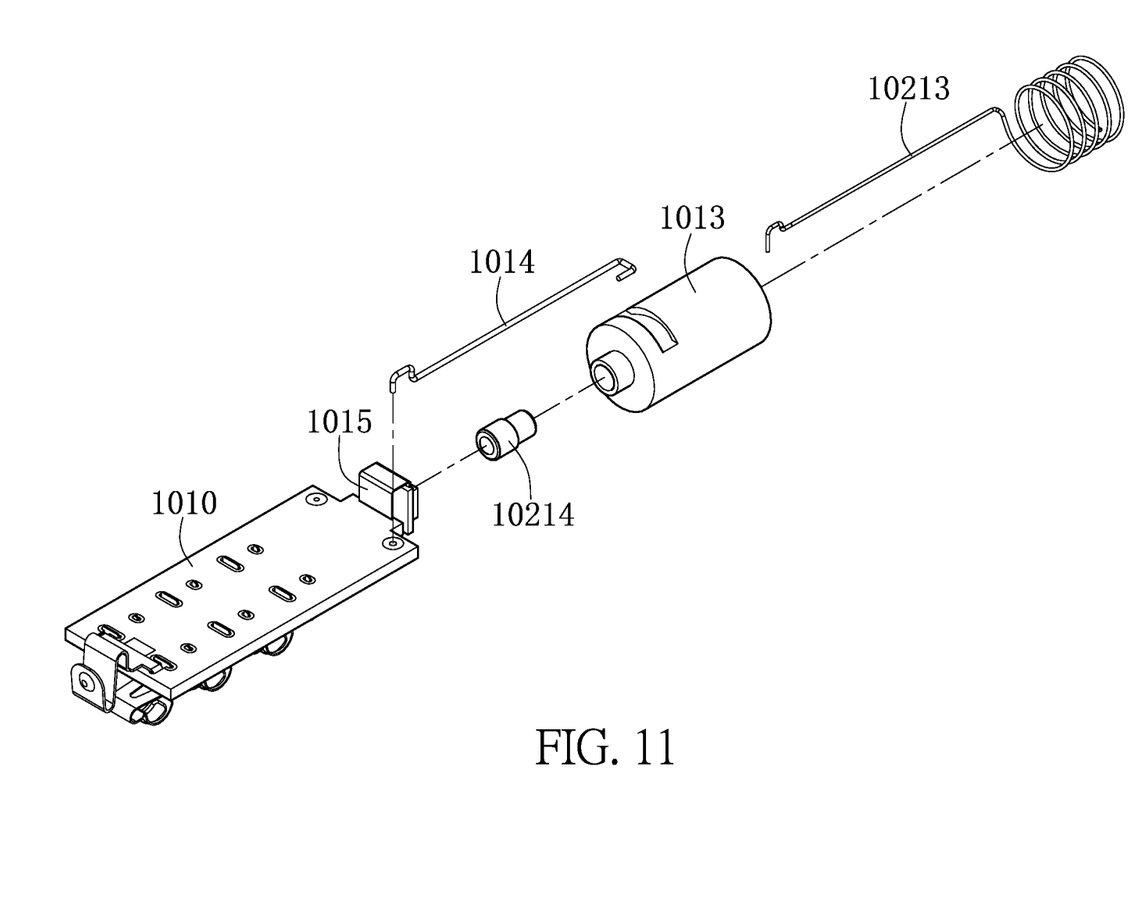
FIG. 11 is a schematic structural view of the message erasing system and the message erasing device according to the fourth embodiment of the present disclosure.

Referring to FIG. 9 to FIG. 11 together with FIG. 1 to FIG. 8, schematic structural views of a message erasing system and a message erasing device according to the fourth embodiment of the present disclosure is shown. As shown in the figures, the message erasing system according to the fourth embodiment of the present disclosure is slightly similar to that of the above-mentioned embodiments. Therefore, similar steps will not be repeated herein. It should be noted that, in the present embodiment, a processing module 101 includes a processing substrate 1010, a first actuator 1011, a second actuator 1012, and a sensing member 1013. A detecting member 1015 is electrically connected to the processing substrate 1010. One end of the sensing member 1013 is electrically connected to the processing substrate 1010, and the other end of the sensing member 1013 surrounds the positioning member 10211. A limiting member 10213 presses against the detecting member 1015 by the limiting member 10214, so that the detecting member 1015 generates a trigger signal, and the processing substrate 1010 generates an erasing signal according to the trigger signal.

Specifically, the processing module 101 of the present disclosure further includes a processing substrate 1010, a detecting member 1015, and a sensing member 1013. The processing substrate 1010 can be a circuit board having functions of signal transmission, signal reception, and operation. The detecting member 1015 can be a degree order sensing element. The sensing member 1013 can be a wiping signal sensing spring. Therefore, in a process of erasing the actual message 110 in the message erasing device 10, a reaction force generated by a clearing unit 1022 touching a carrier 111 is linked to a fixing member 10210 through a sliding member 10212, so that the fixing member 10210 drives the limiting member 10213 and the limiting member 10214 to be displaced, so that the limiting member 10214 presses against the detecting member 1015. Then, the processing substrate 1010 generates an erasing signal according to the pressure order generated by the detecting member 1015. The higher the pressure order generated by the detecting member 1015 is, the stronger an erasing force of the erasing signal generated by the processing substrate 1010 (that is, being sufficient to erase only once) is. The lower the pressure order generated by the detecting member 1015 is, the weaker the erasing force of the erasing signal generated by the processing substrate 1010 (that is, the same position needs to be erased multiple times), but the present disclosure is not limited thereto.

In addition, the processing module 101 of the present embodiment may also include a grounding member 1014. Detailed descriptions thereof may be referred to in the foregoing third embodiment, and thus will not be repeated herein.

Fifth Embodiment

Figure 12:
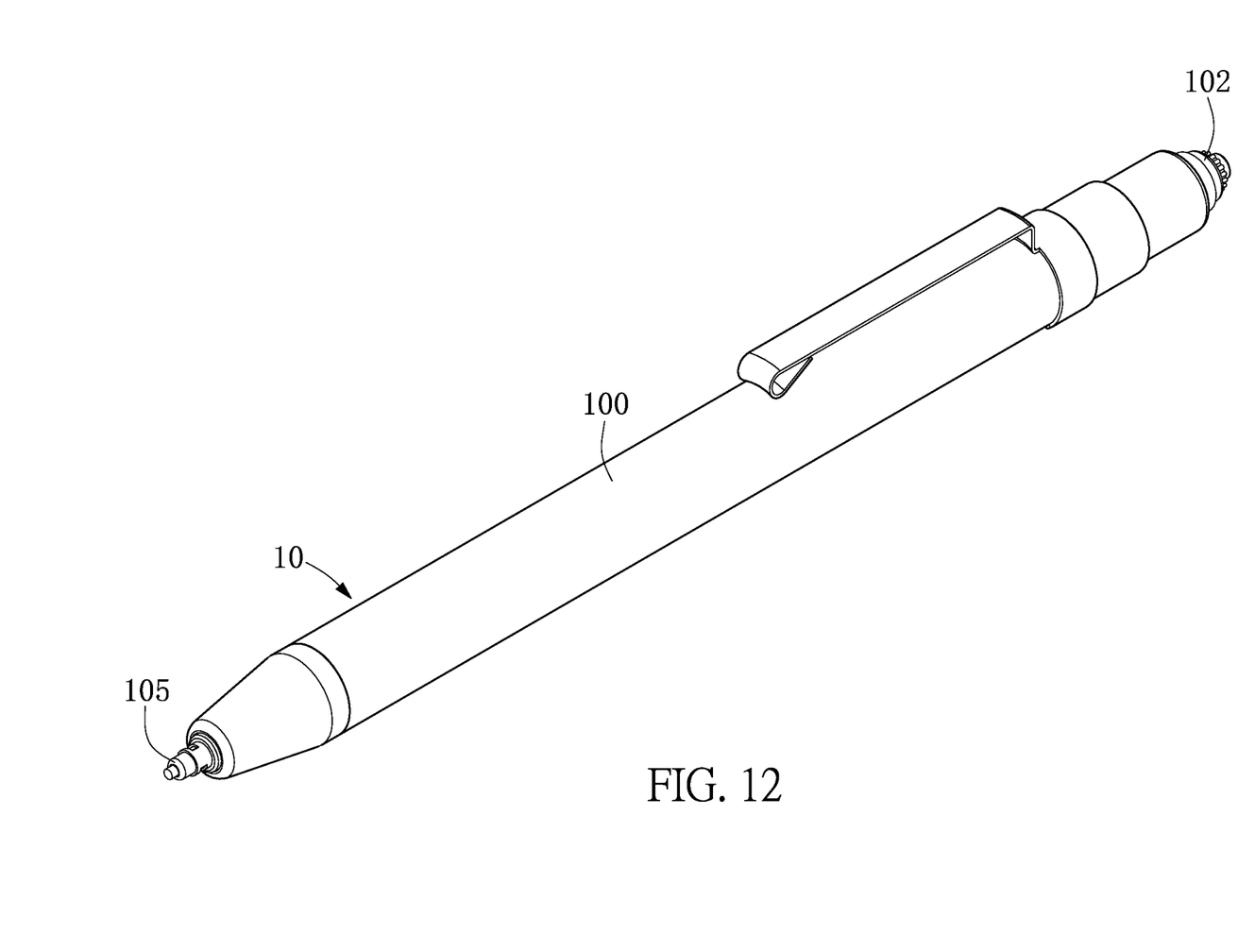
FIG. 12 is a schematic structural view of a message erasing system according to a fifth embodiment of the present disclosure.

Referring to FIG. 12 together with FIG. 1 to FIG. 11, schematic structural views of a message erasing system and a message erasing device according to the fifth embodiment of the present disclosure is shown. As shown in the figures, the message erasing system according to the fifth embodiment of the present disclosure is slightly similar to that of the above-mentioned embodiments. Therefore, similar steps will not be repeated herein. It should be noted that, in the present embodiment, a message erasing device 10 further includes a writing module 105 located at a device body 100 and relative to an erasing module 102. For example, the message erasing device 10 of the present disclosure can be a stylus with a writing module 105 at one end for a user to write a message.

Sixth Embodiment

Figure 13:
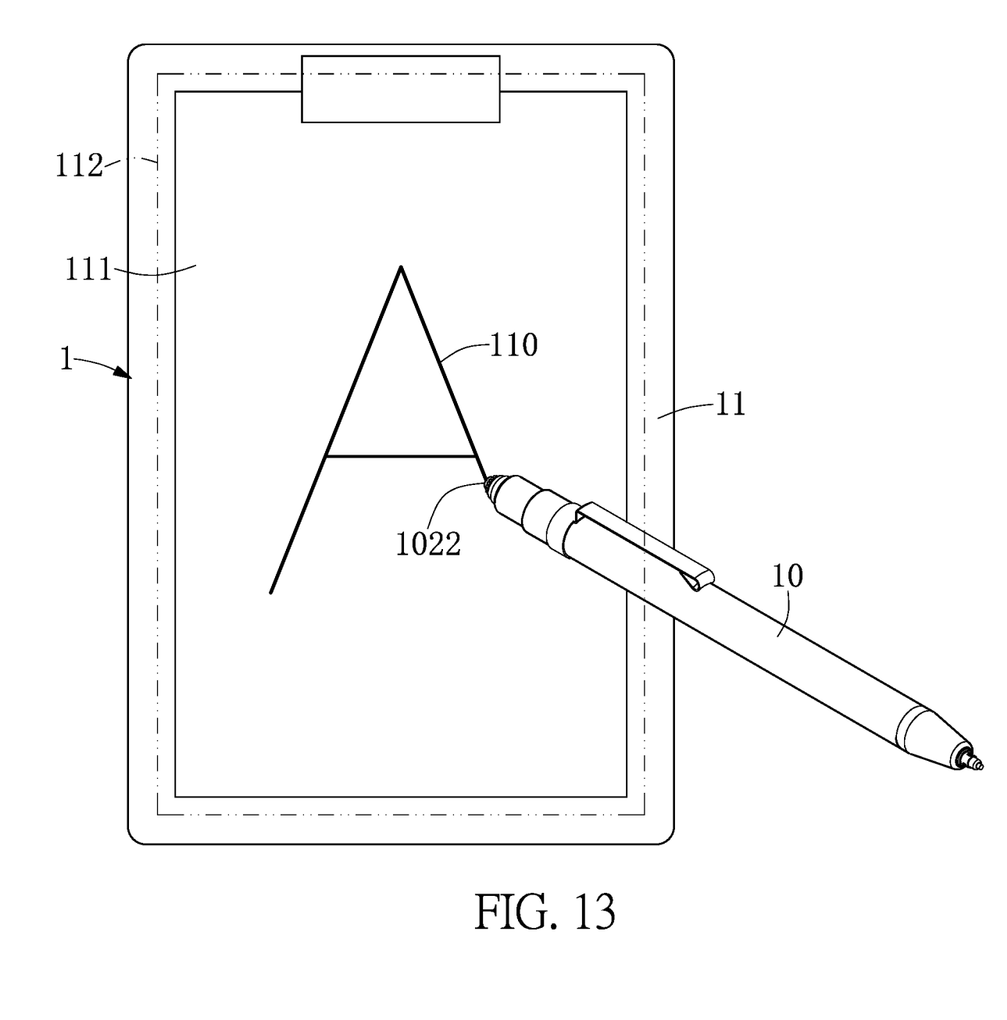
FIG. 13 is a schematic structural view of a message erasing device according to a sixth embodiment of the present disclosure.

Referring to FIG. 13 together with FIG. 1 to FIG. 12, a sixth embodiment of the present disclosure provides message erasing device 10, including: a device body 100, a processing module 101 and an erasing module 102. The device body 100 has opening 1000. A processing module 101 is located in the device body 100. The erasing module 102 includes a movable unit 1021 having an accommodating space 1020 and movably passing through the opening 1000 and a clearing unit 1022 located in the accommodating space 1020. The device body 100 touches a message receiving device 11 and clears an actual message 110 of the message receiving device 11 through a clearing unit 1022, and a movable unit 1021 touches a processing module 101 according to the clearing unit 1022 touching the message receiving device 11, so that the processing module 101 generates an erasing signal to the message receiving device 11.

Specifically, the message erasing device 10 provided in this embodiment is similar to the message erasing device 10 described in the foregoing embodiments, and thus details thereof will not be described herein. Therefore, a user can use the message erasing device 10 in conjunction with the message receiving device 11 in this embodiment. When the user erases the actual message 110 on the carrier 111 of the message receiving device 11 by using the clearing unit 1022, the processing module 101 generates an erasing signal and transmits it to a touchpad 112 of the message receiving device 11 so that the touchpad 112 synchronizes the virtual message corresponding to the actual message 110 according to the erasing signal.

However, the above-mentioned examples are only one of the embodiments and the present disclosure is not limited thereto.

In conclusion, one of the beneficial effects of the present disclosure is that, the message erasing device 10 and the message erasing system 1 provided by the present by the present disclosure has the technical features of "the erasing module 102 including a movable unit 1021 having an accommodating space 1020 and movably disposed in the opening 1000 and a clearing unit 1022 located in the accommodating space 1020," "the device body 100 touching the message receiving device 11 and clearing the actual message 110 of the message receiving device 11 through the clearing unit 1022, and the movable unit 1021 touching the processing module 101 according to the clearing unit 1022 touching the message receiving device 11 so that the processing module 101 generates the erasing signal to the message receiving device 11" and "the message receiving device 11 providing a clear signal to the electronic device 2 according to the erasing signal" so as to provide users with the ability to erase actual messages, such as words, numbers, or patterns in the message receiving device, as well as erase the corresponding virtual texts such as words, numbers or patterns.

Further, the message erasing device 10 and the message erasing system 1 provided by the present disclosure provide users with the ability to erase actual messages, such as words, numbers, or patterns in the message receiving device, as well as erase the corresponding virtual texts such as words, numbers or patterns.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A message erasing system, comprising:
  a message erasing device, including:
    a device body having an opening;
    a processing module located in the device body; and
    an erasing module including a movable unit having an accommodating space and movably passing through the opening, and a clearing unit located in the accommodating space; and
  a message receiving device communicatively linking to the processing module;
  wherein the device body touches the message receiving device by the clearing unit and erases an actual message of the message receiving device, and the movable unit touches the processing module according to the clearing unit touching the message receiving device, so that the processing module generates an erasing signal to the message receiving device; and the message receiving device provides a clear signal to an electronic device according to the erasing signal;
  wherein the movable unit further includes:
    a fixing member movably disposed in the opening, wherein the fixing member has a lodging space, and the fixing member has a guiding portion corresponding to an inner wall surface of the lodging space;
    a positioning member movably disposed in the lodging space, wherein the positioning member has the accommodating space and a plurality of movable slots communicating with the accommodating space;
    a sliding member movably located in the accommodating space, wherein the sliding member has a linking portion movably disposed in each of the movable slots, and the plurality of linking portions are movably connected to the guiding portion;
    a first limiting member movably located in the device body and detachably coupled to the fixing member; and
    a second limiting member detachably coupled to the first limiting member;
  wherein the clearing unit is detachably connected to the sliding member and partially exposed from the outside of the positioning member; the positioning member drives the corresponding linking portion displacement by each of the movable slots, and the plurality of linking portions are guided by the guiding portion, so that the sliding member drives the clearing unit to be displaced in a predetermined direction; wherein the sliding member touches the message receiving device according to the clearing unit, and the positioning member, the fixing member, and the first limiting member are linked so that the first limiting member touches the processing module through the second limiting member.

2. The message erasing system according to claim 1, wherein the processing module further includes:
  a processing substrate located in the device body;
  a first actuator, one end of which is electrically connected to the processing substrate;
  a second actuator, one end of which is electrically connected to the processing substrate; and
  a sensing member, one end of which is electrically connected to the processing substrate, and the other end of which surrounds the positioning member;
  wherein the first limiting member touches the other end of the first actuator and the other end of the second actuator by the second limiting member, so that the first actuator is electrically connected to the second actuator through the second limiting member, and the processing substrate generates the erasing signal according to the first actuator and the second actuator.

3. The message erasing system according to claim 1, wherein the processing module further includes:
  a processing substrate located in the device body;
  a detecting member electrically connected to the processing substrate; and
  a sensing member, one end of which is electrically connected to the processing substrate, and the other end of which surrounds the positioning member;
  wherein the first limiting member presses against the detecting member by the second limiting member, and the processing substrate generates the erasing signal according to the trigger signal.

4. The message erasing system according to claim 1, wherein the message erasing device further includes a writing module located in the device body and relative to the erasing module.

5. A message erasing device, comprising:
  a device body having an opening;
  a processing module located in the device body; and
  an erasing module including a movable unit having an accommodating space and movably passing through the opening, and a clearing unit located in the accommodating space;
  wherein the device body touches the message receiving device by the clearing unit and erases an actual message of the message receiving device, and the movable unit touches the processing module according to the clearing unit, so that the processing module generates an erasing signal to the message receiving device;
  wherein the movable unit further includes:
    a fixing member movably disposed in the opening, wherein the fixing member has a lodging space, and the fixing member has a guiding portion corresponding to an inner wall surface of the lodging space;
    a positioning member movably disposed in the lodging space, wherein the positioning member has the accommodating space and a plurality of movable slots communicating with the accommodating space;
    a sliding member movably located in the accommodating space, wherein the sliding member has a linking portion movably disposed in each of the movable slots, and the plurality of linking portions are movably connected to the guiding portion;

a first limiting member movably located in the device body and detachably coupled to the fixing member; and a second limiting member detachably coupled to the first limiting member;

wherein the clearing unit is detachably connected to the sliding member and partially exposed from the outside of the positioning member; the positioning member drives displacement of the corresponding linking portion by each of the movable slots, and the plurality of linking portions are guided by the guiding portion, so that the sliding member drives the clearing unit to be displaced in a predetermined direction; wherein the sliding member touches the message receiving device according to the clearing unit, and the positioning member, the fixing member, and the first limiting member are linked so that the first limiting member touches the processing module through the second limiting member.

6. The message erasing device according to claim 5, wherein the processing module further includes:

a processing substrate located in the device body;

a first actuator, one end of which is electrically connected to the processing substrate;

a second actuator, one end of which is electrically connected to the processing substrate; and a sensing member, one end of which is electrically connected to the processing substrate, and the other end of which surrounds the positioning member;

wherein the first limiting member touches the other end of the first actuator and the other end of the second actuator by the second limiting member, so that the first actuator is electrically connected to the second actuator through the second limiting member, and the processing substrate generates the erasing signal according to the first actuator and the second actuator.

7. The message erasing device according to claim 5, wherein the processing module further includes:

a processing substrate located in the device body;

a detecting member electrically connected to the processing substrate; and a sensing member, one end of which is electrically connected to the processing substrate, and the other end of which surrounds the positioning member;

wherein the first limiting member presses against the detecting member by the second limiting member, and the processing substrate generates the erasing signal according to the trigger signal.

8. The message erasing device according to claim 5, further comprising a writing module located in the device body and opposite to the erasing module.

* * * * *